United States Patent
Anderson et al.

(10) Patent No.: US 7,143,936 B2
(45) Date of Patent: Dec. 5, 2006

(54) SYSTEM AND METHOD FOR CALCULATING EXPECTED APPROVAL RATES

(75) Inventors: Gordon Emory Anderson, Forest Hills, NY (US); Catherine J. Campanaro, Glendale, AZ (US); David S. Connelly, Gilbert, AZ (US); Sanjay Madaan, Glendale, AZ (US); Kevin L. Moore, Phoenix, AZ (US); Sangarsh Nigam, Jersey City, NJ (US); Yulona Sue Wong, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 10/906,210

(22) Filed: Feb. 9, 2005

(65) Prior Publication Data
US 2006/0178984 A1     Aug. 10, 2006

(51) Int. Cl.
*G06K 5/00* (2006.01)
(52) U.S. Cl. .......................... 235/380; 705/35; 705/38; 705/39; 705/40
(58) Field of Classification Search ................ 235/380; 705/35, 38, 39, 40
See application file for complete search history.

(56) References Cited

U.S. PATENT DOCUMENTS

| | | | |
|---|---|---|---|
| 5,903,830 A * | 5/1999 | Joao et al. ................... | 455/406 |
| 5,914,472 A | 6/1999 | Foladare et al. | |
| 6,125,349 A | 9/2000 | Maher | |
| 6,173,269 B1 | 1/2001 | Solokl et al. | |
| 6,343,279 B1 | 1/2002 | Bissonette et al. | |
| 6,422,462 B1 | 7/2002 | Cohen | |
| 6,529,725 B1 | 3/2003 | Joao et al. | |
| 6,546,418 B1 | 4/2003 | Schena et al. | |
| 6,988,082 B1 * | 1/2006 | Williams et al. .............. | 705/35 |
| 2001/0051917 A1 | 12/2001 | Bissonette et al. | |
| 2002/0010522 A1 * | 1/2002 | Martin ....................... | 700/97 |
| 2002/0069177 A1 | 6/2002 | Carrott et al. | |
| 2002/0143647 A1 | 10/2002 | Headings et al. | |
| 2002/0178071 A1 | 11/2002 | Walker et al. | |
| 2002/0198806 A1 | 12/2002 | Blagg et al. | |
| 2003/0009382 A1 | 1/2003 | DArbeloff et al. | |
| 2003/0149659 A1 * | 8/2003 | Danaher et al. .............. | 705/38 |
| 2003/0167227 A1 | 9/2003 | Mellinger et al. | |
| 2003/0182247 A1 | 9/2003 | Mobed et al. | |
| 2003/0195859 A1 | 10/2003 | Lawrence | |

* cited by examiner

*Primary Examiner*—Jared J. Fureman
*Assistant Examiner*—Daniel A. Hess
(74) *Attorney, Agent, or Firm*—Snell & Wilmer L.L.P.

(57) ABSTRACT

The invention facilitates the computation of expected approval rates based on historic transaction data relating to transaction classes, approved transactions and declined transactions. The invention provides a system and method by which a program administrator for a company may model varying client-imposed limit scenarios in order to determine one or more optimal monthly and/or transactional spending limits. Further, the present invention provides a means for setting varying monthly and/or transaction spending limits for purchases from any number of industries. Providing card members with information regarding optimal spending limits reduces the occurrences of declined credit transactions. A program administrator may also utilize the present invention to provide any number of limit scenarios in order to persuade a card member to increase their client-imposed credit limit to an optimal level thereby reducing the card member's inconvenience caused by declined purchase transactions while recapturing lost revenues by the card issuer.

8 Claims, 6 Drawing Sheets

SYSTEM AND METHOD FOR CALCULATING EXPECTED APPROVAL RATES

FIELD OF INVENTION

The present invention generally relates to reducing point of sale (POS) declines for card members due to purchase transactions exceeding client-imposed credit limits.

BACKGROUND OF INVENTION

Over the years, financial institutions, that provide loans or lines of credit to individuals and business entities, have developed sophisticated systems to manage risk. Models and mathematical formulas have long been tools of the industry for developing an approximation of risk when evaluating customers in consideration for loans and lines of credit. Credit reporting agencies such as Experian™ of Costa Mesa Calif., Equifax™ of Atlanta Ga. and TransUnion™ of Chicago Ill. provide financial institutions with reports reflecting an individual's or business' historical payment data. A credit report is usually the first consideration in evaluating a customer's credit worthiness and most often is the determining factor in whether or not a loan is issued or a line of credit with a credit limit is issued.

A financial institution may also consider other factors in addition to a credit report to determine if a customer is able or likely to repay a loan or money borrowed against a line of credit. The income of a borrower or the fiscal health of a business along with the financial obligations of the borrowing entity are often considered in conjunction with the credit report score in calculating a level of certainty that a loan will not go unpaid.

Financial institutions occasionally reevaluate a customers payment history when determining whether or not to increase a customer's credit limit. At times, a customer may request this evaluation, and at other times, the reevaluation is completed to encourage customer loyalty and maximize profit by encouraging reliable customers to borrow more. However, some corporate line of credit providers allow their client's to place individual limits on corporate cards issued to employees. For example, a client may be eligible for a $20,000 line of credit, however the client may choose to place a self-imposed credit limit at $10,000. Clients may find this desirable to help manage debt and to control spending when corporate cards are issued to employees for business related expenses.

Card members who would otherwise qualify for a higher credit limit, but have had a client-imposed credit limit, may encounter declined purchases because they have reached their client-imposed credit limit. When a card member is declined at the point of sale, they are often not aware that it is due to, for example, a client-imposed limit that has been set by a program administrator within the corporation. A declined card member may therefore assume that a problem exists with the issuer. Declines often result in embarrassment, inconvenience for the card member, and lost customer loyalty to the issuer. Declines due to client-imposed limits also represent a loss in possible revenue to the issuer of the credit line. Within the United States alone, it is not uncommon for and issuer to experience limits-based declines measured in the terms of millions of dollars, which translates to lost revenue and/or great customer dissatisfaction.

Therefore, a need exist for a system and method for creating models based on a card member's spending and decline patterns, wherein account managers and/or program administrators may determine with some certainty an optimal credit limit and recommend the same limit to card members. Further, a need exists for a system and method that may determine optimal credit limits based on two or more transaction types or categories. For example, a program administrator may choose one credit limit for travel related expenses and another limit for purchases relating to office supplies. Such a system may create optimal credit limits for individual categories based on spending and decline transactions relating to each category.

SUMMARY OF INVENTION

The present invention provides program administrators, who may work for entities (e.g., corporations, partnerships, firms, non-profits, universities, school boards, etc.) who utilize corporate credit or charge cards an expected approval rate calculator to help determine, set, and/or change card member limits. The expected approval rate calculator calculates expected approval rates based on a card member's transactional history, monthly and transaction variances, preferred supplier list thresholds and the main purchasing purpose of a specific transaction account (e.g., LAN equipment, Advertising, Office Supplies, etc.). In addition, the invention also provides the program administrator an expected approval rate that may be experienced by the card member, given the limit that has been set. For instance, if the program administrator selects "Advertising" from the drop-down list, and enters a $5,000 transaction limit, the approval rate calculator will indicate that this will result in an transaction approval rate of 95%. The program administrator may then change the limit (or the approval rate) up or down, and the approval rate (or transaction limit) will change correspondingly.

The invention may be supplemented by, for example, a default 10% variance for all future monthly or transaction limits that are set in OPM (Online Program Management). The card issuer may also send various data to specific high-decline-rate clients to show them their declines problem and encourage them to raise their self-imposed limits.

More particularly, the invention may determine transaction limits by retrieving transaction information of an existing account holder; and calculating transaction information under varying scenarios to determine a recommendation, wherein the recommendation relates to a transaction limit for minimizing authorization declines on a transaction account. Calculating expected transaction approvals may include retrieving limit data input from a program administrator, retrieving transaction information of an existing account holder and calculating an expected approval rate, wherein the expected approval rate may be calculated using the limit data and the transaction information.

An approval rate calculator may be an important tool in reclaiming many of the declined transactions. The calculator may also reduce POS declines and greatly increase card member satisfaction and charge volume. Limit calculations from an approval rate calculator helps to manage risk through appropriate spending limits by identifying appropriate transaction and/or monthly limits for card members who regularly exceed their limits while attempting to perform their job duties. The invention is a self-service information tool that client Managers of Account Development or Program Administrators may run as desired. The users may also use the tool to become better aware of the transaction patterns of individual card members and attempt to predict card members' real business needs. Moreover, by reducing limits-based issues, the declines are lowered and merchant satisfaction increases.

The invention also includes a computer-implemented method for facilitating the calculation of an expected transaction approval rate based upon at least one of a transaction limit, transactional history, periodic variance, transactional variance, preferred supplier threshold, industry restrictions and typical usage. The invention may also include facilitating the calculation of a transaction limit based upon an expected transaction approval rate. This transaction limit calculation may also be based upon at least one of a transactional history, periodic variance, transactional variance, preferred supplier threshold, industry restrictions and typical usage.

BRIEF DESCRIPTION OF DRAWINGS

A more complete understanding of the present invention may be derived by referring to the detailed description and claims when considered in connection with the Figures, wherein like reference numbers refer to similar elements throughout the Figures, and:

DETAILED DESCRIPTION

The detailed description of exemplary embodiments herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

Figure 1:
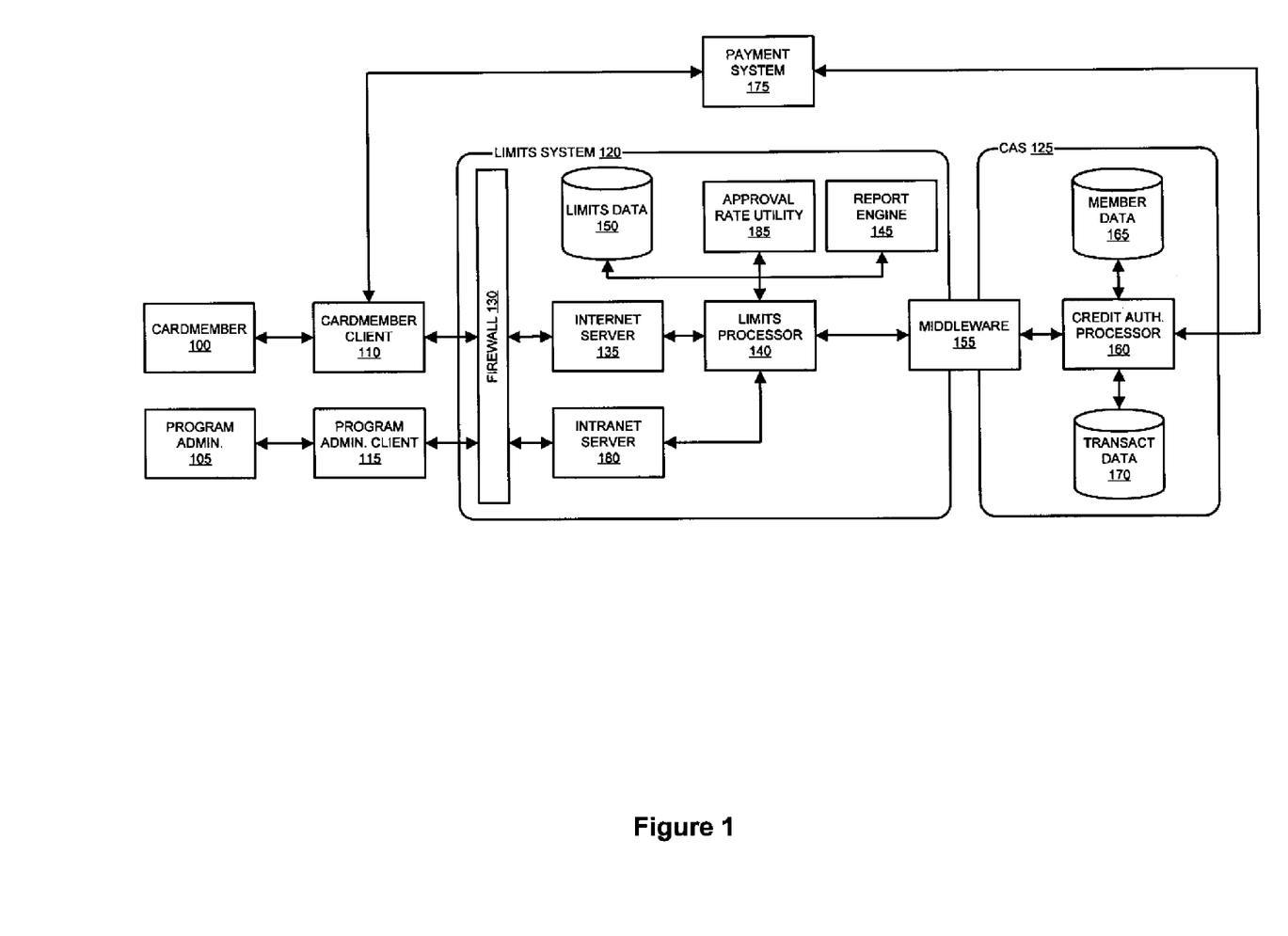
FIG. 1 is a block diagram illustrating exemplary major system components for calculating expected approval rates based on card member spending patterns according to one embodiment of the present invention.

In general, the present invention includes a system and method for calculating expected approval rates for client-imposed spending limits. Referring to FIG. 1, a system for calculating expected approval rates may include, for example, real-time analysis of a card member's client-imposed limits, spending patterns and data regarding declined credit transactions. Card member 100 or program administrator 105 can invoke a limits system 120 in order determine optimal transactional or monthly limits to suggest for purchases. Further, card member 100 or program administrator 105 may employ the invention to calculate optimal limits regarding one or more purchase categories. For example, a program administrator 105 may invoke a limits system 120 to provide expected approval rates for differing categories of purchases such as, for example, travel expenses, office supplies, utilities, lease payments, client entertainment and the like. The invention may be incorporated into or used in association with any financial management system such as, for example, U.S. patent application Ser. No. 10/709,703, entitled "Pay Yourself First" filed on May 24, 2004, which is hereby incorporated by reference.

Limits system 120 contains various hardware and/or software components suitably configured to calculate expected approval rates based on spending patterns and/or other transactional history indices. In one embodiment, with reference to FIG. 1, the limits system 120 includes a firewall 130, an Internet server 135, an intranet server 180, limits processor 140, approval rate utility 185, report engine 145, limits data 150 and middleware 155. External entities may include a card member 100, card member client 110, program administrator 105, program administrator client 115, payment system 175 and a card authorization system (CAS) 125. A CAS 125 may contain a credit authorization processor 160, decline database 165 and CAS log 170 among other data, hardware and/or software components.

As will be appreciated by one of ordinary skill in the art, the present invention may be embodied as a customization of an existing system, an add-on product, upgraded software, a stand alone system (e.g., kiosk), a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Referring to FIG. 1, a card member client 110 and a program administrator client 115 may interface with a limits processor 140 either directly or indirectly and via any communication device set forth herein. In one embodiment, a card member client 110 may communicate with a limits processor 140 through an Internet server 135. Internet server 135 may include any hardware and/or software suitably configured to facilitate transactions between a card member client 110 and a limits processor 140. Internet server 135 may operate as a single entity in a single geographic location or as separate computing components located together or in separate geographic locations. Further, Internet server 135 may also comprise an intranet server or may send, receive and process data via a network both to and from one or more Internet servers.

A card member 100 may include any individual, business, entity, software and/or hardware. The card member 100 may also participate in, for example, a revolving line of credit service such as those offered by American Express, Visa, MasterCard, Discover, Diners Club and the like. A card member 100 may be provided a credit instrument such as a magnetic stripe card, smartcard or fob transponder for facilitating purchase transactions, however this is not necessary. Card member 100 may utilize only an account number. Card member 100 may be an account holder or another person or entity with authorization to utilize an account (e.g., an employee). Card member 100 may interact with a limits system 120 through a card member client 110 in order to access the functionality of the approval rate utility 185.

A card member client 110 may include any software and/or hardware that facilitate communications and/or transactions between a card member 100 and the Internet server 135. A card member client 110 may interface with an Internet server 135 via an Internet browser connected to the Internet using standard dial-up, cable, DSL or any other Internet protocol known in the art. Further, card member client 110 may interface with the an Internet server 135 via any device or method discussed herein or known in the art. In one embodiment, a card member client 110 may interface directly with the limits processor 140 via a secure protocol such as a local area network (LAN), wide area network (WAN), intranet, extranet, and the like.

An "account" or "account number", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a fob having a transponder and RFID reader in RF communication with the fob. Although the present invention may include a fob embodiment, the invention is not to be so limited. Indeed, system may include any device having a transponder which is configured to communicate with RFID reader via RF communication. Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A card member account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type, etc. In this example, the last (sixteenth) digit is used as a sum check for the sixteen-digit number. The intermediary eight-to-ten digits are used to uniquely identify the card member. A merchant account number may be, for example, any number or alpha-numeric characters that identifies a particular merchant for purposes of card acceptance, account reconciliation, reporting, or the like.

In order to restrict unauthorized access to the components of the limits system 120, a firewall 130 may be employed and Internet connections may first pass through a firewall 130 before communicating with the Internet server 135. Firewall 130 may include any hardware and/or software suitably configured to protect limits system 120 components from users of other networks and provide limited or restricted access to card member clients 110 accessing a limits processor through an Internet connection. Firewall 130 may reside in varying configurations including Stateful Inspection, Proxy based and Packet Filtering among others. Firewall 130 may be integrated within an Internet server 135, intranet server 180 or any other limits system 120 component. Further, firewall 130 may reside as a separate hardware and/or software entity.

A program administrator 105 may include any individual, business, entity, software and/or hardware that manages one or more service offerings of a financial institution or organization. The program administrator 105 may be an employee of a corporation who is responsible for managing a corporate line of credit as well as interfacing with the invention to manage client-imposed credit limits for individual employee card members. In another embodiment, the program administrator 105 may be a representative of the issuer who works with a corporate client to manage corporate line of credit and/or other financial products. In yet another embodiment, the program administrator 105 may be a trusted third-party such as, for example, an advisor or consultant to the corporate client. The program administrator 105 may connect and interact with a limits processor 140 through a program administrator client 115. In another embodiment, a program administrator 105 may interact with a limits processor 140 directly.

A program administrator client 115 may connect with a limits processor 140 through an interface with an Internet server 135 via an Internet browser connected to the Internet using standard dial-up, cable, DSL or any other Internet protocol known in the art. Further, program administrator client 115 may interface with the an Internet server 135 via any device or method discussed herein or known in the art. A program administrator client 115 may connect directly with the Internet server 135 over a secure connection, or may connect through a firewall 130. In one embodiment, a program administrator 115 may interface directly with the limits processor 140 via a secure protocol such as a local area network (LAN), wide area network (WAN), intranet, extranet, and the like.

A program administrator client 115 and a card member client 110 may comprise computing units or systems which may take the form of a computer or set of computers, although other types of computing units or systems may be used, including laptops, notebooks, hand held computers, set-top boxes, workstations, computer-servers, main frame computers, mini-computers, PC servers, network sets of computers, and/or the like. Further, any computing device discussed herein may also be a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc.

Limits processor 140 may transmit requests for data to a card authorization system (CAS) 125. A request for data from one or more CAS 125 databases may include any information relevant to a card member's 100 credit account, trends, transactional history and declines. CAS 125 may include any hardware and/or software suitably configured to process credit transactions between a card member 100 and a merchant's payment system 175. CAS 125 may contain one or more databases which store information relating to card member's 100 credit account and may include, for example, authentication credentials, billing information, credit limits, transactional data and the like. Specifically, a CAS 125 may contain a CAS log 170 which may store all transaction data including both approved and declined transactions. When a credit authorization processor 160 receives a request to authorize a purchase transaction, the results of the request along with information such as transaction time, merchant ID, purchase amount, etc., may be transmitted to the CAS log 170 where it may be stored. Additionally, decline database 165 may store all transactional data specific to transaction declines. For example, when a card member who has exceeded his monthly client-imposed credit limit attempts to make a purchase using his corporate credit card, the transaction will be declined by the credit authorization processor 160 which may then transmit the transaction information to the decline database 165 to be stored. In another embodiment, the decline database 165 may be populated with decline transactional information periodically, rather than at the time the transaction is declined. For example, a CAS 125 process may run at predetermined intervals in order to identify and copy declined transaction details from the CAS log 170 to the decline database 165. Both the decline database 165 and the CAS log 170 may provide relevant information to the invention in the compilation of limits reports and the analysis thereof.

An approval rate utility 185 may include any hardware and/or software suitably configured to receive and process data from a limits processor 140. An approval rate utility 185 may request data from any number of databases either directly or through a limits processor 140 in order to calculate expected approval rates for monthly and transaction limits, for example. An approval rate utility 185 may reside as a software component within a limits processor 140 or may reside as a separate entity comprising any number of hardware and/or software components.

The hardware and software components of a CAS 125 are known in the art as they are employed by various credit line providers in order to perform payment authorizations and processing of purchase transactions. For simplicity, CAS 125 is described as including a credit authorization processor 160 for processing payment requests from a payment system 175, a decline database 165 for storing information relating to a card member's 100 declined credit transactions and a CAS log 170 for storing card member's 100 transactional history. Decline database 165 and CAS log 170 may contain any number of data points and the limits processor 140, based on expected rate approval calculations, may request data containing all data points, or a subset thereof. Those skilled in the art will appreciate that a CAS 125 may comprise any number of hardware and/or software component in any number of configurations.

To facilitate communications between a limits processor 140 and a credit authorization processor 160, middleware 155 may be employed to process and format transactions in order to be suitably received by either of the two systems. For example, a limits processor 140 may comprise a host computing system employing a Windows operating system. The credit authorization processor 160, on the other hand, may comprise a mainframe employing a UNIX operating system. In order to suitably exchange requests between the two disparate computing systems, a middleware 155 component may first receive and format a request in order that it may be suitable received and processed by the other system. Middleware 155 components are commercially available and known in the art. Middleware 155 may be implemented through commercially available hardware and/or software, through custom hardware and/or software components, or through a combination thereof. Further middleware 155 may reside in a variety of configurations and may exist as a standalone system or may be a software component residing on the limits processor 140.

According to one embodiment, the present invention may allow a program administrator 105 and/or card member 100 to request a report based on, for example, at least one of credit account expected approval rates, spending patterns, decline information, recommended limits, modifications to limits and the like. Following receipt of card member 100 information resulting from a request to the one or more databases of the limits system 120 and/or CAS 125, limits processor 140 may process and transmit card member 100 information to a report engine 145. Report engine 135 may include any hardware and/or software suitably configured to produce reports from information stored in one or more databases. Report engines 145 are commercially available and known in the art. Report engine 135 may provide printed reports, web access to reports, graphs, real-time information, raw data, batch information and/or the like. The report engine 145 may be implemented through commercially available hardware and/or software, through custom hardware and/or software components, or through a combination thereof. Further, report engine 145 may reside as a standalone system within a limits system 120 or as a component of the limits processor 140. In one embodiment, report engine 145 may be configured to process requests from a limits processor 140 to query a limits database 150, databases within a CAS 125, or a combination of thereof. Data received from a limits processor 140 and/or one or more database queries may be formatted by the report engine 145 and transmitted to a limits processor 140. Limits processor 140 may transmit formatted reports to a program administrator client 115 and/or card member client 110 via an Internet server 135, intranet server 180 or directly to a LAN/WAN connected program administrator client 115.

Limits database 150 may include any hardware and/or software suitably configured to facilitate storing limits data and/or historical data which may be used to analyze trends relating to a card members 100 spending patterns. Further, limits database 150 may comprise any information which may be used to identify card members 100, user credentials, credit accounts, transaction records and the like. For simplicity, limits database 150 is illustrated and described herein as a single database.

One skilled in the art will appreciate that the limits system 120 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information may be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data which also may be distinct from other subsets.

As stated above, in various embodiments of the present invention, the data may be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, provider, issuer, user or the like. Furthermore, the security information may restrict/permit only certain actions such as accessing, modifying, and/or deleting data sets. In one example, the data set annotation indicates that only the data set owner or the user are permitted to delete a data set, various identified providers are permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The present invention may contemplate a data storage arrangement wherein the header or trailer, or header or trailer history, of the data is stored on the transaction instrument in relation to the appropriate data.

The calculation and/or reporting functions may also interface with and/or share data with any loyalty systems and loyalty point databases. Any portion or process of the invention may also incorporate the issuance or redemption of loyalty points or any other incentive function. In other embodiments, the invention may also interface with and/or share data with any loyalty systems and loyalty point databases. Any portion or process of the invention may also incorporate the issuance or redemption of loyalty points or any other incentive function such as, for example, the functions set forth in U.S. Ser. No. 10/378,456 filed on Mar. 3, 2003 by Antonucci, et al. and entitled System And Method For The Real-Time Transfer Of Loyalty Points Between Accounts, which is hereby incorporated by reference. For more information on loyalty systems, transaction systems, electronic commerce systems and digital wallet systems, see, for example, U.S. patent application Ser. No. 09/836,213, filed on Apr. 17, 2001 by inventors Voltmer, et al. and entitled System And Method For Networked Loyalty Program; U.S. Continuation-In-Part patent application Ser. No. 10/027,984 was filed on Dec. 20, 2001 by inventors Ariff, et al. and entitled System And Method For Networked Loyalty Program; U.S. Continuation-In-Part patent application Ser. No. 10/010,947 filed on Nov. 6, 2001 by inventors Haines, et al. and entitled System And Method For Networked Loyalty Program; the Shop AMEX™ system disclosed in U.S. patent application Ser. No. 60/230,190 filed Sep. 5, 2000; the MR as Currency™ and Loyalty Rewards Systems disclosed in U.S. patent application Ser. No. 60/197,296 filed on Apr. 14, 2000; U.S. patent application Ser. No. 60/200,492 filed Apr. 28, 2000; U.S. patent application Ser. No. 60/201,114 filed May 2, 2000; the digital wallet system disclosed in U.S. patent application Ser. No. 09/652,899 filed Aug. 31, 2000; the stored value card disclosed in U.S. patent application Ser. No. 09/241,188 filed Feb. 1, 1999; the system for facilitating transactions using secondary transaction numbers disclosed in U.S. patent application Ser. No. 09/800,461 filed Mar. 7, 2001; and also in related U.S. Provisional Patent Application Ser. No. 60/187,620 filed Mar. 7, 2000; U.S. Provisional Patent Application Ser. No. 60/200,625 filed Apr. 28, 2000; and U.S. Provisional Patent Application Ser. No. 60/213,323 filed May 22, 2000, all of which are herein incorporated by reference. Other examples of online membership reward systems are disclosed in Netcentives U.S. Pat. No. 5,774,870, issued on Jun. 30, 1998, and U.S. Pat. No. 6,009,412, issued on Dec. 29, 1999, both of which are hereby incorporated by reference.

The various system components discussed herein may include one or more of the following: a server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: user data, debt data, income data, provider data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. user computer may be in a home or business environment with access to a network. In an exemplary embodiment, access is through a network or the Internet through a commercially-available web-browser software package.

As used herein, the term "network" or "communication" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Provider (ISP) over the local loop as is typically used in connection with standard modem communication, cable modem, Dish networks, ISDN, Digital Subscriber Line (DSL), or various wireless communication methods. See, e.g., GILBERT HELD, UNDERSTANDING DATA COMMUNICATIONS (1996), hereby incorporated by reference. It is noted that the network may be implemented as other types of networks, such as an interactive television (ITV) network. Moreover, the system contemplates the use, sale or distribution of any goods, services or information over any network having similar functionality described herein.

The computers discussed herein may provide a suitable website or other Internet-based graphical user interface which is accessible by users, hosts or operators of the system. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service which receives a request from a web server, the request including a URL (http://yahoo.com/stockquotes/ge) and an IP address (123.56.789). The web server retrieves the appropriate web pages and sends the data or applications for the web pages to the IP address. Web services are applications which are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated herein by reference.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

Each participant in the present invention may be equipped with a computing device in order to interact with the system and facilitate compilation of limits reports. The card member 100 and program administrator 105 may each have a computing unit in the form of a personal computer, although other types of computing units may be used including laptops, notebooks, hand held computers, set-top boxes, cellular telephones, touch-tone telephones and the like. In one embodiment, the program administrator may have a computing unit implemented in the form of a computer-server, although other implementations are contemplated by the invention. The credit line provider has a computing center shown as a server. However, the credit line provider computing center may be implemented in other forms, such as a mini-computer, a PC server, a network of computers located in the same of different geographic locations, or the like. Moreover, the system contemplates the use, sale or distribution of any services or information over any network having similar functionality described herein These computer program instructions may also be stored in a computer-readable memory that may direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based computer systems which perform the specified functions or steps, or suitable combinations of special purpose hardware and computer instructions.

Figure 2:
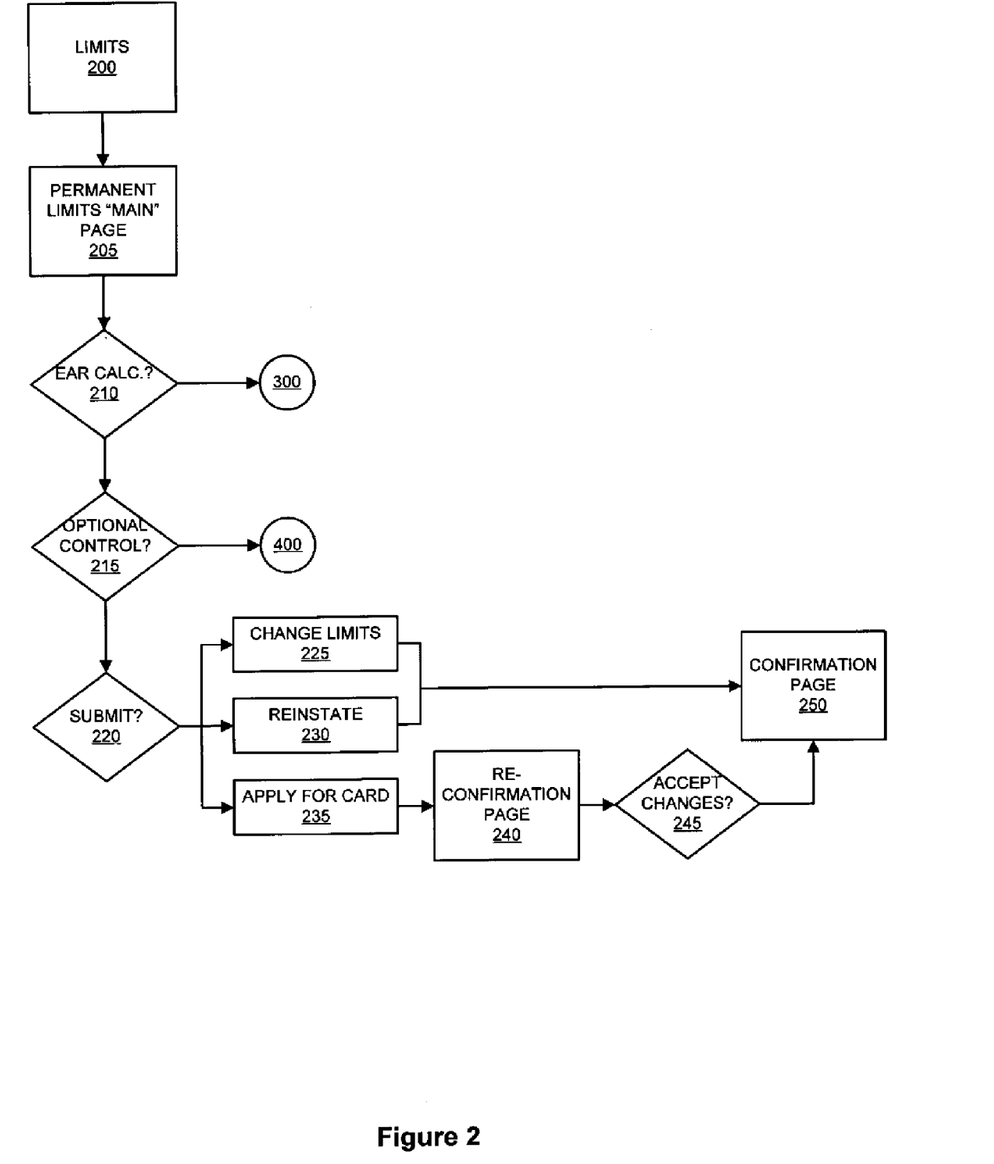
FIG. 2 is a flow chart illustrating a high-level view of an exemplary system and method for calculating approval rates according to one embodiment of the present invention.
Figure 3:
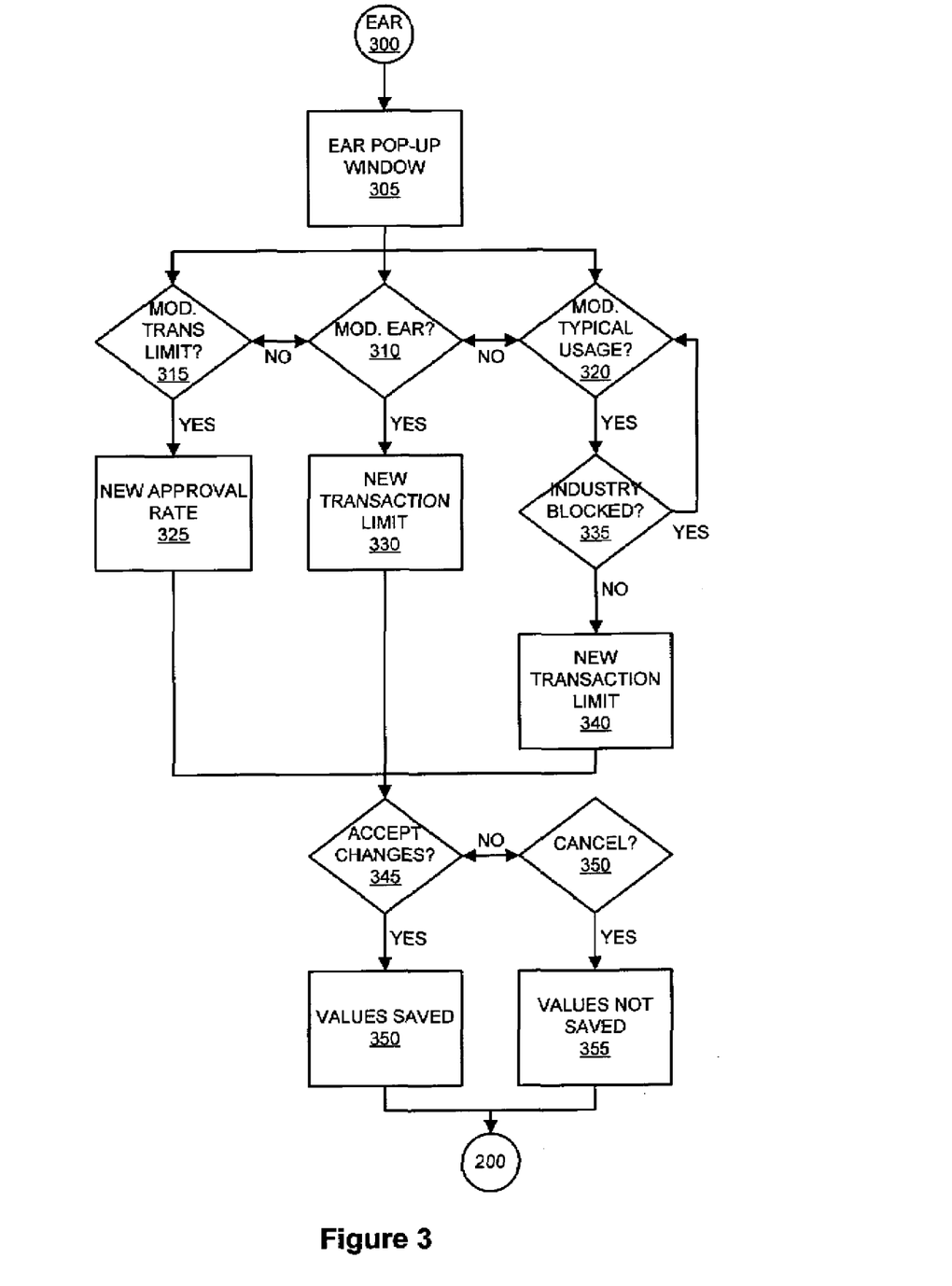
FIG. 3 is a flow chart illustrating exemplary process steps regarding modification of limit and usage rules for calculating approval rates according to one embodiment of the present invention.
Figure 4:
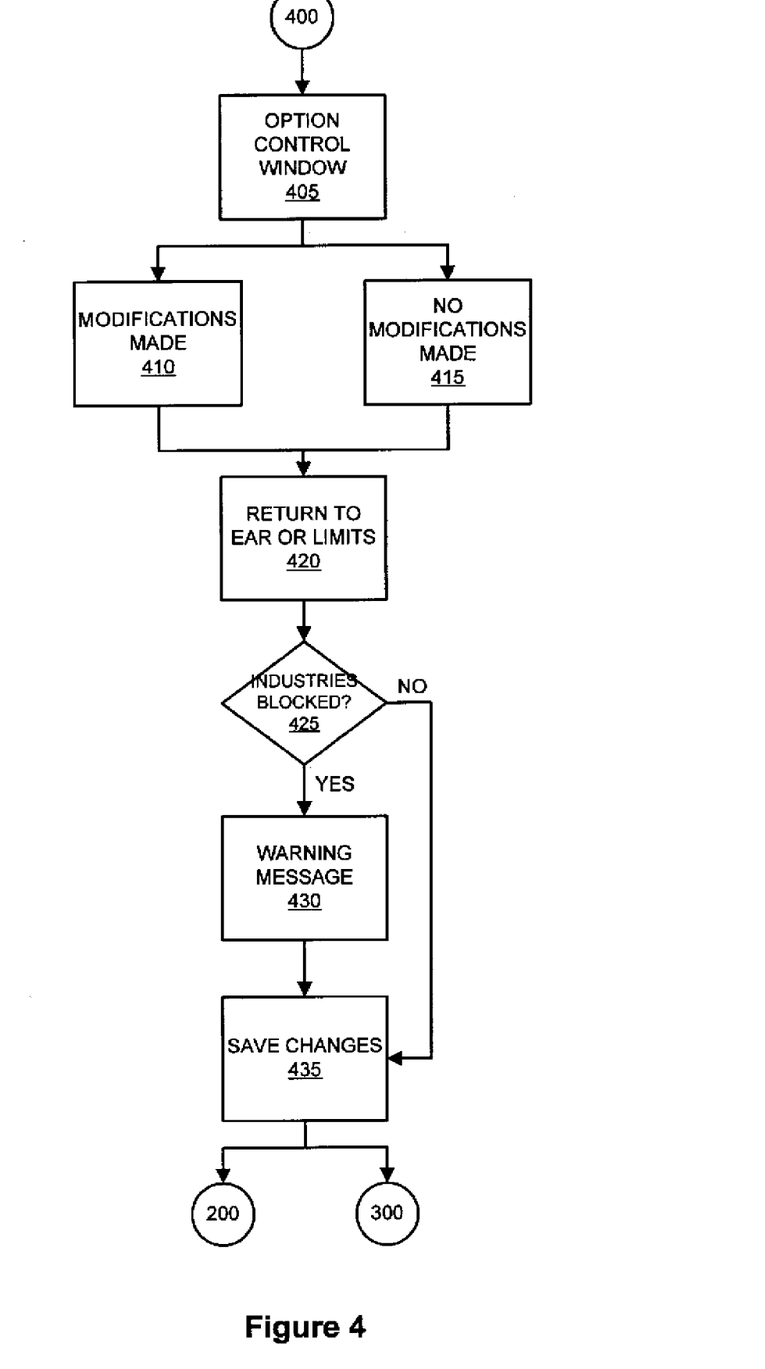
FIG. 4 is a flow chart illustrating an exemplary method for defining optional controls according to one embodiment of the present invention.

Referring now to FIGS. 2–4, the process flows represent exemplary embodiments of the invention and are not intended to limit the scope of the invention as described herein. For example, the steps recited in any of the method or process descriptions may be executed in any order and are not limited to the order presented. It will be appreciated that the following descriptions may make appropriate reference to not only the steps depicted in FIGS. 2–4, but also to the various system components as described above with reference to FIG. 1. Further, illustrations of the process flows and the descriptions thereof may make reference to user windows, webpages, websites, web forms, prompts, etc. Practitioners will appreciate that the illustrated steps described herein may comprise any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Frequent mention is made herein to "client-imposed" credit limits. Those skilled in the art will appreciate that the present invention may also be used to calculate expected approval rates and modify limits imposed by card issuers or any other person or entity. For example, the invention may be useful in providing a system and method whereby a card member's issuer-imposed limit is under re-consideration, either at the request of the card member or as normal policy. In another example, a parent may impose a limit on a child's charge card. This information may be used in conjunction with other information such as, for example, the card member's 100 credit worthiness, repayment history, amount of time card member 100 has remained in good standing and the like.

For simplicity, it should be assumed that the entity interacting with a limits system 120 to perform the steps as illustrated in FIGS. 2–4 is a program administrator 105. A program administrator 105 may act on a card member's 100 behalf in order to employ the invention to determine and set optimal client-imposed limits. The program administrator 105 may enter card member 100 information into the various fields and forms presented by the limit system 120. Card member 100 information may be supplied to a program administrator 105 through any means known in the art such as, for example, a written request, paper forms, email, telephone conversation, and the like. However, it should be appreciated that a card member 100 may interact with the limits system 120 independent of a program administrator 105.

Figure 5:
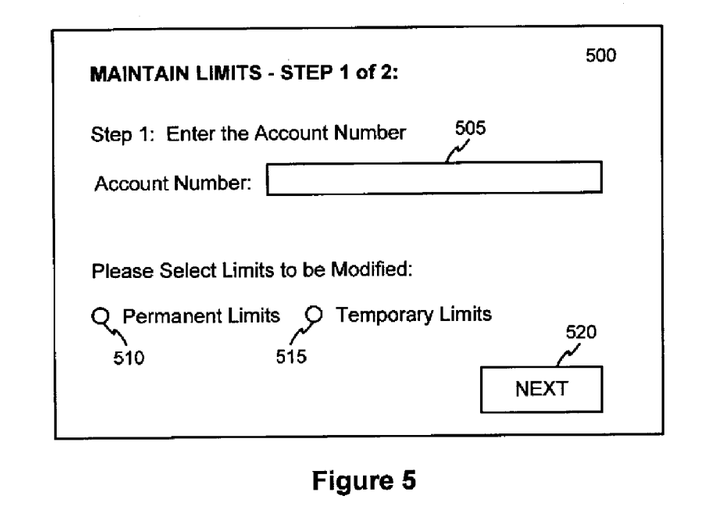
FIG. 5 is an exemplary screen shot of an interface wherein preliminary information may be entered to initiate an approval rate calculator according to one embodiment of the present invention.
Figure 6:
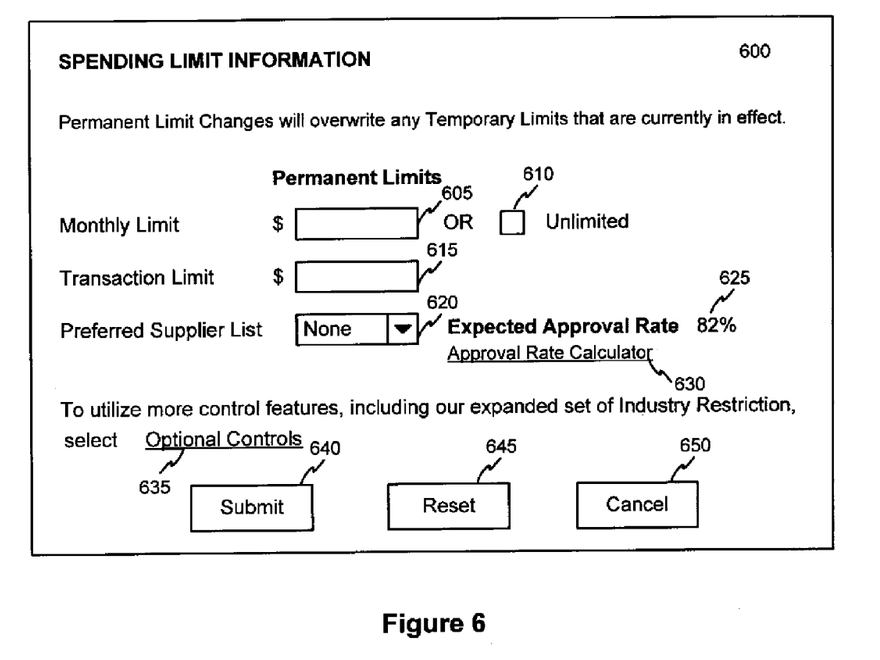
FIG. 6 is an exemplary screen shot of an interface wherein information regarding spending limits may be entered within an approval rate calculator according to one embodiment of the present invention.

FIG. 2 is a flow chart illustrating a high-level view of an exemplary system and method for calculating approval rates. When appropriate, the description of FIG. 2 will reference the exemplary screen shots as illustrated in FIGS. 5 and 6. At step 200, a program administrator 105 connects with the limits system 120. In one embodiment, functionality relating to the expected rate calculator may be accessible from a main webpage or window which provides links to any number of different webpages and/or windows encompassing other functionality commonly used by a program administrator's 105. For example, a program administrator may access a limits webpage or window (step 200) through a program administrator 105 home page which provides links to view credit reports, report a stolen card, report suspicious transactions, accept payments, and the like.

From a limits webpage or interface (step 200), the program administrator 105 may enter a card member account number (FIG. 5, 505) and select whether to modify permanent limits (FIG. 5, 510) or temporary limits (FIG. 5, 515). Following entry of a card member 100 account number and the selection of a limits type, program administrator 105 may select a "next" button (FIG. 5, 520) initiating a request to a limits system 120 for the current limit settings and expected approval rate for card member 100. When limits system 120 transmits card member 100 information in response to the request, the information may be displayed in the permanent limits main webpage (step 205). Card member 100 information may include a previously set monthly limit (FIG. 6, 605), transaction limit (FIG. 6, 615), preferred supplier list (FIG. 6, 620) and an expected approval rate (FIG. 6, 625).

From a permanent limits main webpage (step 205), the program administrator 105 may select a link to an interface to the expected approval rate calculator (step 210), thereby opening the expected approval rate calculator in a new webpage or window as discussed in reference to FIG. 3 beginning at step 300. A program administrator 105 may also select a link to the optional control (step 215), thereby opening an optional control webpage or window as will be discussed in reference to FIG. 4 starting at step 400. If the program administrator 105 has completed changes to the card member 100 limits information resulting from steps 210 and/or 215, he or she may submit (FIG. 6, 640) the changes (step 220). Submitting changes may transmit new and/or modified information to a limits system 120 where it may be saved to a limits database 150. Further, upon receiving a transmission of new and/or modified information, a limits processor 140 may invoke an approval rate utility 185 to calculate an expected approval rate and/or limit.

If card member 100 limits were modified (step 225) or original limits were reinstated (step 230), then the modified limits information may be transmitted to a limits system 215 and saved as new values in a limits database 150. Following a successful save transaction, a program administrator 105 may be presented a confirmation page (step 250) summarizing one or more changes made to a card member's 100 account. If an application for a new card was executed (step 235), then the program manager 105 may be presented with re-confirmation page (step 240) and prompted to accept the changes (step 245) prior to committing the application to the limits system 215. If the changes are accepted, then the program manager 105 may be presented with a confirmation page (step 250) summarizing the new card application.

FIG. 3 is a flow chart illustrating process steps regarding modification of limit and usage rules within an exemplary method for calculating approval rates. When the program manager 105 selects a link to open the approval rate calculator, a request may be transmitted to a limits system 120 for limits default values. Limit system 120 may transmit results based on the request to the program administrator client 115 in order to populate the fields of the approval rate calculator upon opening the webpage or window (step 305).

Figure 7:
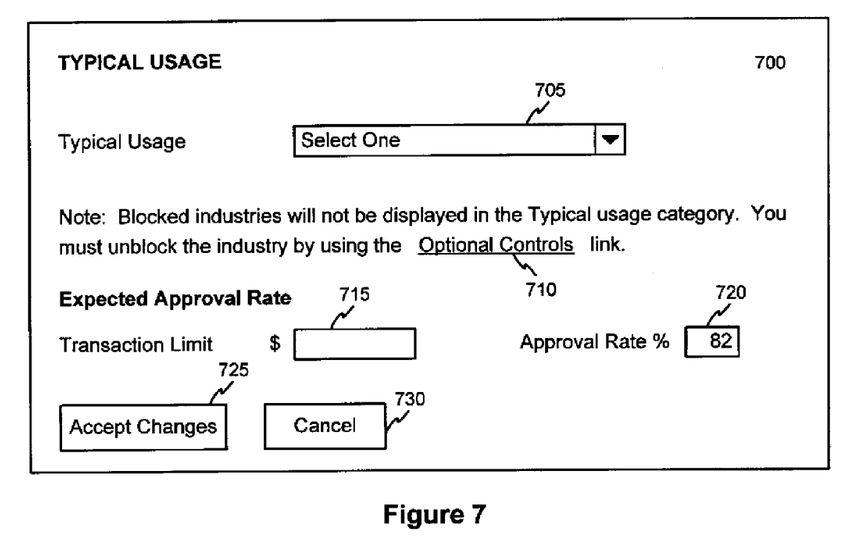
FIG. 7 is an exemplary screen shot of an interface wherein information regarding typical usage may be defined within an approval rate calculator according to one embodiment of the present invention.

From within the approval rate calculator window (step 305), a program administrator may modify a transaction limit (step 315), modify an expected approval rate (step 310) and/or modify a typical usage (step 320). If the program administrator modifies the transaction limit (step 315), then the limits processor may invoke the approval rate utility 185 to calculate an expected approval rate and dynamically display the new approval rate (step 325) in the approval rate field (FIG. 7, 720).

While not illustrated, an approval rate utility 185 may send a request for transactional data to one or more CAS 125 databases and/or a limits database 150. On receipt of the transactional data, the approval rate utility 185 may remove duplicate decline transactions. Duplicate credit requests may result when a card is processed two or more times when it is believed that a hardware and/or software problem may be to blame for a declined transaction. Duplicate requests would likely result in an inaccurate expected approval rate calculation, therefore may be removed.

Transactional data stored within CAS log 170, which may include authorized and declined transactions for a range of industry categories, may be combined with decline data stored with a decline database 165 in order to calculate an approximation of the percentage of transactions that will be approved given the supplied transaction limit for the selected typical usage. One or more modified limits parameters may be used by the approval rate utility 185 to calculate an expected approval rate scenario. The system may acquire service establishment codes to determine how the data relates to a particular category of transactions. For example, based on a card member with a client-imposed monthly limit of $3,000, a program administrator may enter a new monthly limit of $4,000 for travel related expenses. An expected approval rate may be obtained by the calculation: Approval Rate=$100*(1-EXP\{-1*(constant*limit))\}$. The "constant" multiplier is obtained through the calculation: constant=2.99/limit. Therefore, if the card member's limit is $3,000, then we can first calculate the constant; 2.99/3000=0.000997. Now, with the constant and current limit known, we can construct the following equation to calculate the expected approval rate if we were to raise the card member's limit to $4,000.

$$100*(1-2.718282\{-1*(0.000997*4,000))\}=98.14385$$
or 98%

In one embodiment, expected approval rates may be produced by extracting transaction data from CAS log 170 and the decline database 165 and examining decline rates within one or more industry codes. Based on decline information, a curve may be constructed that trades off the card member's 100 transaction limit as compared to the approval rate within industry code categories. Those skilled in the art will appreciate that there are any number of methods for calculating a value from a number of variables which may include adding threshold values, applying curves, weighting values, etc.

The invention may further support reverse calculations for expected approval rates. The program administrator 105 may modify a number in the approval rate field (step 310) thereby invoking the approval rate utility 185 to calculate a new transaction limit and dynamically display the new transaction limit (step 330) in the transaction limit field (FIG. 7, 715). Using the same scenario as presented above, changing the number in the expected approval rate field (i.e. from 98% to 99%) may result in a new transaction limit for the card member. Therefore, a new transaction limit based on a modified expected approval rate can be calculated by using the equation; Transaction Limit=(−1/constant)*(LN{1−Approval Rate/100}). Therefore, with the constant known, we can construct the following equation to calculate a new transaction limit based on a change to the expected approval rate from 98% to 99%.

$$(-1/0.000997)*(LN\{1-99/100\})=(-1003.01*-4.61)$$
$$=4623.83 \text{ or } \$4625$$

Modifying the typical usage (step 320) may again invoke the approval rate utility 185 to calculate a new approval rate based on the selected typical usage (FIG. 7, 705). Prior to invoking the approval rate utility 185, a check may be made to verify that the selected typical usage is not an industry that has been blocked (step 335). As will be described in greater detail in reference to FIG. 8, a card member 100 may request to block certain industries (e.g., based flagging certain service establishment codes) in order to prevent card use for transactions with blocked industries. When a typical usage changes, a request may be transmitted to the limit system 120 to verify that the selection has not been blocked. If the typical usage selection is blocked (step 335), then the program administrator 105 may be alerted and allowed to select a different typical usage (step 320).

If the selected typical usage has not been blocked (step 335), then the approval rate utility 185 may be invoked to calculate a new approval rate for the selected typical usage. The approval rate utility 185 may draw on transactional data from a limits database 150 and/or one or more CAS 125 databases to calculate a new approval rate based on the set limit, the number of transactions falling within the selected typical usage, average amount of the transactions, number of declined transactions, and the like. Continuing with the example provided for steps 315 and 310, changing a selected typical usage from "travel" to "accommodations" which has a client-imposed monthly limit of $4,000, a monthly average number of accommodation related charges of 20 and an average of four declines per month may result in a new expected approval rate relating to the typical usage change. As demonstrated by the presented examples, a rate utility 185 may use a variety of data types relating to approved transactions, declined transactions, monthly limits, transactional limits and typical usage to calculate expected approval rates and/or limits. Those skilled in the art will appreciate that the invention may include additional data types an employ any number of calculation algorithms to produce expected approval rates and/or limits.

Prior to saving modifications to a limits database 150, a program administrator 105 may be prompted to accept the changes (step 345). If the changes are not accepted (step 345), then the program administrator 105 may be prompted to verify their intention to not accept the changes (step 350). If the program administrator 105 verifies that they do not wish to accept the changes by canceling modifications (step 350), then the modified values are not saved (step 355) and the expected approval rates webpage or window may close, returning the program administrator 185 to step 200 of FIG. 2. However if the program manager 105 accepts the changes (step 345), the modified limit information may be transmitted to a limits system 120 and saved within a limits database 150.

FIG. 4 is a flow chart illustrating an exemplary method for defining option controls. Option controls may enable a program administrator 105 to apply rules governing how a credit account is used. As will be discussed in greater detail in reference to FIG. 8, optional controls facilitate defining monthly and transaction variances, a PSL threshold value and industry restrictions according to a card member 100 request.

Step 400 represents an entry point to the option controls webpage or window 405 which may be accessed from the permanent limits main page (FIG. 6) or the typical usage webpage or window (FIG. 7). Prior to showing the option controls webpage or window 405, a request may be transmitted to a limits system 120 in order to obtain previously saved option controls information. Following receipt of option controls information, the monthly variance, transaction variance and PSL threshold limit fields may be populated and the appropriate industry restriction check boxes may be selected. A program administrator 105 may view and modify the option controls settings and select an "accept changes" button if modifications were made (step 410). Modifications may be transmitted to a limits system 120 and stored in a limits database 150. If no modifications were made (step 415) or the program administrator 105 does not desire to save modifications then program administrator 105 may select a "cancel" button which will close the options controls webpage or window.

Any modifications to the option controls would be returned to the expected approval rate or limits window (step 425). If an industry had been previously blocked, a selection of that industry in the typical usage window may result in a warning message (step 435) alerting the program administrator 105 that a block must be removed from the selected industry prior to setting limits. A program administrator 105 may select a button to save the changes initiating a transmission of the modified information to a limits system 120 where it may be stored in a limits database 150. Upon closing the option controls webpage or window, control may be returned to either the main limits page (FIG. 2) or the expected approval rate webpage or window (FIG. 3) from which it was invoked.

FIG. 5 is a screen shot of an exemplary interface wherein preliminary information may be entered to initiate an exemplary approval rate calculator. In order to retrieve card member 105 information from a limits system 120, a program administrator 105 may be presented a webpage or window 500 and prompted to enter a card member 105 account number 500. A program manager 105 may also select whether to modify permanent limits 510 or temporary limits 515. The selection may dictate what set of data to retrieve from a limits database 150.

While not illustrated, one embodiment may include a system and method for allowing a program manager 105 to define and/or modify limits that are only enforced on a temporary basis. For example, a card member 105 may block industries and set transaction limits on a card issued to his employee for use during business travel. A program administrator 105 under the direction of a card member 100 may set temporary limits providing a date upon which to remove the temporary limits and restore a set of permanent limits, if applicable.

Following entry of a card member 100 account number and a selection of what type of limits to modify, a program administrator 105 may select a button or link 520 in order to initiate a data retrieval process. A request comprising an account number and limits type selection, may be transmitted to the limits system 120 and used to query a limits database 150. Information resulting from the query, if any, may be transmitted to a program administrator client 115 where it may be used to populate the fields of a permanent limits main page 600.

FIG. 6 is a screen shot of an exemplary interface wherein information regarding spending limits may be entered within an exemplary approval rate calculator of the present invention. A permanent limits main page 600 may comprise fields wherein monthly limits 605 and transaction limits 615 may be entered, viewed and/or modified. A monthly limit 605 may comprise any number of transactions and define a limit wherein when the limit is met, subsequent transaction requests should be declined. Alternatively, a check box may be selected to indicate that no monthly spending limit is to be applied 610. Transaction limit 615 may define an acceptable maximum spending limit to be applied to any single transaction regardless of whether a monthly limit 605 has been specified.

A preferred supplier list (PSL) 620 may comprise a group of suppliers that card member 100 and/or program administrator 105 have developed a trusted relationship with and/or have contractually negotiated discounts. According to one embodiment, varying spending limits may be applied to suppliers on a preferred suppliers list as opposed to those not on the list. For example, it may be desirable for a card member 100 to attach a higher spending limit to a preferred supplier due to confidence that the supplier will offer the very best prices. In another embodiment, a preferred supplier list may be restrictive, in that card member 100 may only transact with members of the preferred supplier list. Selecting a preferred supplier list 620 for a card member 100 may limit the card member 100 to making purchases only from those vendors on the list, up to the transaction limit. If no preferred supplier list is chosen, the card member 100 may make purchases at any vendor, except for those in blocked industries. The preferred suppliers may be indicated in the system by flagging certain service establishment codes.

A permanent limits main page 600 may also include a link to the approval rate calculator 630 and a link to the optional controls 335. Both will be discussed in greater detail herein, however the approval rate calculator may provide an accurate calculation of a card member's 100 expected approval rate based on typical usage, optional control settings and a transaction limit. The optional controls effect the expected approval rate calculation through configured variances, a PSL threshold limit and industry restrictions.

When the program administrator 105 enters and/or modifies any of the fields in the permanent limits main page 600, a request may be transmitted to a limits system 120 which invokes the approval rate utility 185. The approval rate utility 185 calculates an expected approval rate based on the modified fields and transmits the calculated rate to the program administrator client 115 where it may be displayed 625 within the permanent limits main page 600.

After defining new spending limits and/or modifying existing limits, a program administrator 105 may submit 640 permanent limits main page 600 data thereby transmitting the new and/or modified limits data to the limits system 120 wherein the data may be saved to a limits database 150. A program administrator 105 may also reset the permanent limits main page 600 which may restore the original values. Canceling 650 may close the permanent limits main page 600 without transmitting and saving the data to a limits database 150.

FIG. 7 is a screen shot of an exemplary interface wherein information regarding typical usage may be defined within an exemplary approval rate calculator of the present invention. The typical usage webpage or window 700 enables the program administrator 105 to selectively apply varying card member 100 limits to different industries such as, for example, accommodations, travel, restaurant, oil/gas, car rental and the like. A program administrator 105 may select an industry from a typical usage dropdown or list 705 and enter a transaction limit 715. As discussed in reference to FIG. 3, an expected approval rate may be calculated from historic transactional data relating to the selected typical usage. A combination of the selected industry and the transaction limit may be transmitted to a limits system 220 which may invoke an approval rate utility 185 to calculate an expected approval rate. The calculated approval rate may be transmitted to the program administrator client 115 where it may be displayed 720 in the typical usage webpage or window 700. Just as the typical usage 705 and transaction limit 715 may be modified to effect the calculation of the approval rate 720, a program administrator 105 may modify the typical usage 705 and the approval rate 720 to effectively create a reverse calculation wherein the approval rate utility 185 may provide a transaction limit 715 calculation. A program administrator 105 may also activate the optional controls window by selecting a link 710 on the typical usage webpage or window 700. If the program administrator 105 selects to accept the changes 725, the new and/or modified typical usage information may be transmitted to a limits system 120 and saved to a limits database 150.

Figure 8:
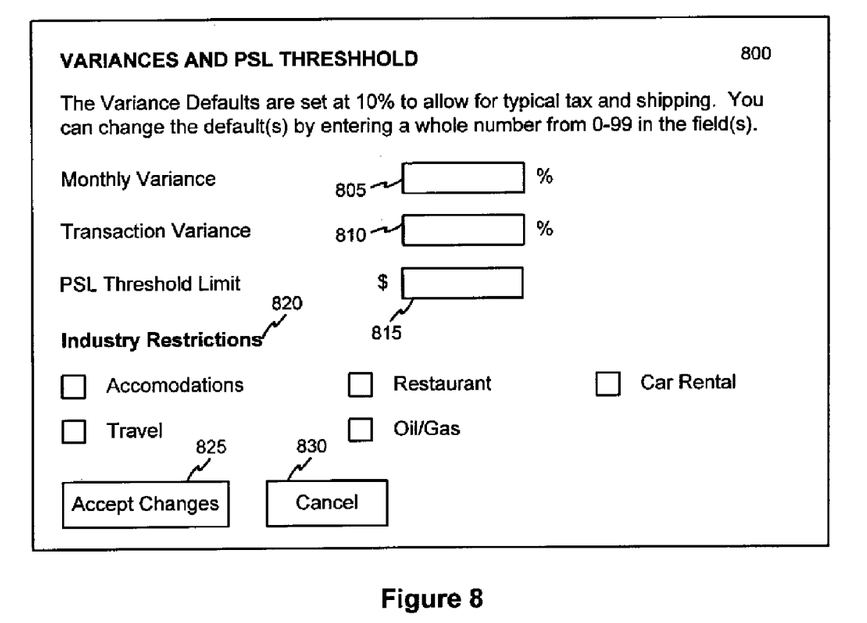
FIG. 8 is an exemplary screen shot of an interface wherein variances and industry restrictions may be defined within an approval rate calculator according to one embodiment of the present invention.

FIG. 8 is a screen shot of an exemplary interface wherein variances and industry restrictions may be defined within an exemplary approval rate calculator. Variances define an amount card member 100 may exceed monthly and/or transaction limits. This may be desirable when limits are tightly set and a card member 100 desires to eliminate declines when a transaction only slightly exceeds a limit. For example, a program administrator 105 on request from a card member 100 may set a monthly limit to $2,000. If the card member 100 uses her account to purchase a product for $1,950 the card member will be within her limit. However, taxes and shipping fees in the amount of $85 would clearly put the transaction above the limit and therefore the transaction would be declined. Therefore, setting a monthly variance 805 to 10% would prevent the purchase transaction from being declined due to added taxes and fees. In one embodiment, a variance calculation may be added to the actual transaction limit wherein in the transaction limit as stored in a database is increased by the percentage of the variance. In another embodiment, a variance percentage may be recorded in a separate database field where the transaction limit remains unchanged, however a variance is calculated in real-time when a transaction limit is exceeded.

The program administrator 105 may also set a preferred supplier list (PLS) threshold limit 815 for a card member 105. If the card member 105 attempts a charge above the PSL threshold but below the transaction limit, the charge may only be allowed if the supplier is captured on the preferred supplier list. If the charge is below the PSL threshold limit, the charge may only be declined if the supplier is not in one of the allowed industries specified for the card member 105. The industry restrictions 820 enable a program administrator 105 acting on behalf of the card member 100 to block the card member 100 from spending in the selected industries.

Following definition or modification of variances and PSL threshold, the program administrator 105 may select to accept the changes, thereby transmitting the new or modified settings to the limits system 120 to be saved to a limits database 150. If the program administrator 105 does not wish to save the settings, he or she may select cancel to close the variances and PSL threshold webpage or window.

Practitioners will appreciate that the screen shots and descriptions thereof are provided for a better understanding of the invention. The present invention may be deployed in any number of configurations, programming architectures, user interface elements, webpage technologies, etc. Further, grouping of functionality as shown in the illustrations may be arranged in any suitable manner. Multiple screens may be presented within any one or more screens, windows, webpages, popup windows, dialog boxes and the like.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

It should be understood that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A computer implemented method for facilitating a calculation of an expected transaction account approval rate, said method comprising the steps of:

retrieving account data for a transaction account, wherein said account data includes transaction account approval information, transaction account decline information, and at least one of a monthly limit, transactional limit, option control, and typical usage, and wherein said transaction account is configured to purchase at least one of goods and services;

receiving a desired modification of at least one of said monthly limit, said transactional limit, said option control, and said typical usage; and, calculating said expected transaction account approval rate based on said desired modification, said transaction account approval information, and said transaction account decline information.

2. The method of claim 1 further including modifying said expected transaction account approval rate to obtain revised transactional limits.

3. The method of claim 1 further including modifying said at least one of monthly limit, transactional limit, option control, and typical usage to obtain a revised transactional limit.

4. The method of claim 1 further including preparing a report including said expected transaction account approval rate and at least one of said transaction account approval information, said transaction account decline information, and said at least one of a monthly limit, transactional limit, option control, and typical usage.

5. The method of claim 1, wherein said option control includes at least one of a monthly variance, transaction variance, industry restrictions, and a preferred supplier list threshold.

6. A computer implemented method for facilitating a calculation of a transactional limit based upon an expected transaction account approval rate, said method comprising the steps of:

retrieving account data for said transaction account, wherein said account data includes transaction account approval information, transaction account decline information, and at least one of a monthly limit, transactional limit, option control, and typical usage, and wherein said transaction account is configured to purchase at least one of goods and services;

receiving a desired modification of at least one of said monthly limit, said transactional limit, said option control, and said typical usage; and, calculating said transactional limit based on said desired modification and said at least one of said transaction account approval information and said transaction account decline information.

7. The method of claim 6, wherein said option control includes at least one of a monthly variance, transaction variance, industry restrictions, and a preferred supplier list threshold.

8. A computer-readable storage medium containing a set of instructions for a general purpose computer configured for facilitating the steps of:

retrieving account data for a transaction account, wherein said account data includes transaction account approval information, transaction account decline information, and at least one of a monthly limit, transactional limit, option control, and typical usage, and wherein said transaction account is configured to purchase at least one of goods and services;

receiving a desired modification of at least one of said monthly limit, said transactional limit, said option control, and said typical usage; and, calculating said expected transaction account approval rate based on said desired modification, said transaction account approval information, and said transaction account decline information.

* * * * *